US006750567B1

(12) United States Patent
Elli et al.

(10) Patent No.: US 6,750,567 B1

(45) Date of Patent: Jun. 15, 2004

(54) ACTUATION AND CONTROL DEVICE FOR ELECTRIC SWITCHGEAR

(75) Inventors: Enrico Elli, Verano in Brianza (IT); Carlo Gemme, Genova Quinto (IT); Giandomenico Testi, Osio Sotto (IT)

(73) Assignee: ABB Research Ltd, Zurich (CH)

( * ) Notice: Subject to any disclaimer, the term of this patent is extended or adjusted under 35 U.S.C. 154(b) by 232 days.

(21) Appl. No.: 10/030,684

(22) PCT Filed: Jun. 20, 2000

(86) PCT No.: PCT/EP00/05941

§ 371 (c)(1),
(2), (4) Date: May 20, 2002

(87) PCT Pub. No.: WO01/06528

PCT Pub. Date: Jan. 25, 2001

(30) Foreign Application Priority Data

Jul. 14, 1999 (EP) .......................................... 99202306

(51) Int. Cl.[7] .............................. H01H 3/26; H02P 3/00

(52) U.S. Cl. ....................................... 307/143; 318/265

(58) Field of Search ................................ 307/139, 140, 307/143; 318/265, 466

(56) References Cited

U.S. PATENT DOCUMENTS 3,654,535 A * 4/1972 Hendry et al. .............. 318/267
3,742,246 A * 6/1973 Nitta et al. ................. 307/143
4,423,336 A * 12/1983 Iverson et al. ................ 307/64
4,945,253 A * 7/1990 Frohardt ................ 250/559.16
5,629,869 A * 5/1997 Johnson et al. ............... 702/34
6,531,841 B1 * 3/2003 Elli et al. ................... 318/466

FOREIGN PATENT DOCUMENTS

| | | |
|---|---|---|
| DE | 38 22 342 | 1/1989 |
| DE | 44 40 423 | 5/1996 |
| WO | 93 06612 | 4/1993 |
| WO | 95 28025 | 10/1995 |
| WO | 96 36982 | 11/1996 |

* cited by examiner

*Primary Examiner*—Adolf Berhane
(74) *Attorney, Agent, or Firm*—Oblon, Spivak, McClelland, Maier & Neustadt, P.C.

(57) ABSTRACT

An actuation and control device for opening and/or closing an electric switchgear which is connected to an electrical network and has at least one fixed contact and at least one movable contact. The actuation and control device includes an actuator operatively connected to the movable contact to supply the energy to perform opening/closing operations. A measuring mechanism detects the voltage and/or the current of at least one of the phases of the network. The actuator includes a motor with position control, which is operatively connected to the movable contact, and an electronic control and power supply unit which receives information from the measuring mechanism and, following an operation command, sends to the motor electrical signals for driving the motor so that the movement of the movable contact is controlled in relation to a predetermined operation time and to the received information.

11 Claims, 6 Drawing Sheets

ACTUATION AND CONTROL DEVICE FOR ELECTRIC SWITCHGEAR

DESCRIPTION

The present invention relates to an actuation and control device for opening/closing an electric switchgear, for example circuit breakers, disconnectors and the like, particularly for high- and medium-voltage transmission and/or distribution networks, i.e. for voltages higher than 1000 Volt.

In particular, the actuation and control device according to the present invention allows to improve maneuvers of the switchgear from both a mechanical and an electrical point of view, making it possible to perform the electrical operations in a "synchronous" and repeatable manner in relation to the network parameters. The device according to the present invention is particularly adapted for use in high-voltage circuit breakers and is now described with reference to this application without limiting in any way its scope of application.

As it is known, a single pole of a high voltage circuit breaker comprises a first post-shaped supporting insulator arranged on a supporting frame, a second insulator which is arranged on the upper end of said first insulator, and an interruption chamber, with interruption mechanisms constituted by fixed contacts and movable contacts, which is provided inside said second insulator. The movable contacts are operatively connected to an actuation rod, which runs inside the first insulator from the movable contacts to the base of the post. The rod is actuated by means of kinematic systems located in a housing at the base of the post and operatively connected to an actuation device.

Closing and opening of the circuit breaker are performed in relation to a control signal sent, for example, by a control panel or by a protection logic; in particular, this signal is sent to the actuation device that causes engaging and disengaging of the fixed contacts from the movable contacts.

At the present state of the art, currently used actuation devices, generally of the mechanical or hydraulic type, are structurally complicated and operate according to a not adjustable rule of motion. For example, mechanical actuation devices generally use two springs, namely a closure spring and an opening spring, a stroke-limiting shock absorber, a reloading motor for the closure spring, and a mechanism which allows to convert the motion produced by the springs into a translatory motion of the movable contact, reload the opening spring, and make the opening movement independent of the closure movement. Besides the very large number of components which require long to and complicated initial adjustment, one severe drawback resides in the fact that the movement of the movable contact is determined exclusively by the elastic characteristic of the opening and closure springs; the rule of motion of the movable contact cannot be changed by the user but is set during design. Actuation devices of the hydraulic type, in which the movement of the movable contact is ensured by adapted hydraulic actuators, can partially obviate these drawbacks, but have disadvantages linked to the presence of fluids, particularly owing to their temperature-sensitivity.

As a matter of fact, opening or closing operations of the circuit breakers are generally asynchronous in relation to the phases of the electrical parameters, which is to say they do not have any temporal relationship with the electrical network; this in most cases leads to the generation of transients in the electrical network due to prestrike phenomena during closing and restrike phenomena during opening. In particular, depending on the type of load present in the electrical network, an operation performed at a non-optimal moment could cause high frequency oscillation phenomena with high amplitudes compared to the rated values of the electrical parameters of the electrical network; the current values can, for example, even rise several orders of magnitude higher than the rated current value. These transients clearly subject the electrical network to anomalous stresses and have the potential to cause misfunctioning of the electronic protections, to reduce the expected life of the equipment connected to the electrical network and even to lead to the shutdown of said equipment with high detriment to the continuity of power supply, especially in industrial plants. Moreover they lead in any case to a greater wear of the contacts of the circuit breaker itself and consequently reduce its useful life.

The absence of control over the rule of motion of the actuation device also requires the presence of dampers or shock-absorbers to dissipate the residual kinetic energy at the end of the actuation and to avoid uncontrolled impacts against the pole. Furthermore, precision in the positioning of the movable contact is limited by a mechanism, which is inherently inaccurate owing to the presence of the springs.

Owing to the large number of components, the devices of the prior art require maintenance in order to maintain their nominal behavior and thus ensure repeatability of the actuation by compensating for variations due to system wear and aging. Actuation repeatability in any case has inherent limits.

Moreover, the energy that must be supplied is higher than the energy strictly required to move the movable contact, since it is necessary to also move the various mechanical elements of the switchgear.

The aim of the present invention is to provide an actuation and control device for an electric switchgear, such as for example circuit breakers, disconnectors, and the like, which allows to control the actuation of the switchgear in such a way to perform opening or closing operations synchronously, taking as a reference at least one individual phase, in relation to the electrical parameters of the network, irrespective of the command instant sent from a control panel or a protection logic. It should be understood that the opening and/or closing operation may be considered synchronous when, having set an ideal tripping moment in relation to the type of load and the load and network neutral connection to ground, such as for example the zero voltage for a capacitor or the peak voltage for a reactive load, the disengagement/engagement of the contacts falls within a synchronization time window around the ideal moment, so that the transients obtained are sufficiently low.

Within the scope of this aim, an object of the present invention is to provide an actuation and control device for an electric switchgear, such as for example circuit breakers, disconnectors and the like, which enables to obtain synchronism of the operation with the waveform of the electrical network with different types of networks and loads present, thus distinguishing itself by considerable flexibility in use.

Another object of the present invention is to provide an actuation and control device for an electric switchgear, such as for example circuit breakers, disconnectors and the like, that guarantees the repeatability of the operation to be performed as well as its optimization in relation to the different types of breaking techniques chosen.

A further object of the present invention is to provide an actuation and control device for an electric switchgear, such as for example circuit breakers, disconnectors and the like, that allowing to obtain operations that are synchronous with the waveform of the electrical network makes it possible to increase its reliability while also increasing the electrical and mechanical life of equipment present in it.

Another object of the present invention is to provide an actuation and control device for an electric switchgear, such as for example circuit breakers, disconnectors and the like, which has reduced mechanical complexity.

A further object of the present invention is to provide an actuation and control device for an electric switchgear, such as for example circuit breakers, disconnectors and the like, that makes it possible to decrease the energy used in the operation, thus making it possible to optimize the sizing of the actuator and of the power supply system, with a consequent economic benefit.

Not the last object of the present invention is to provide an actuation and control device for an electric switchgear, such as for example circuit breakers, disconnectors and the like, that is highly reliable and relatively easy to manufacture at competitive costs.

Thus the present invention relates to an actuation and control device for opening and/or closing an electric switchgear which is connected to an electrical network and has at least one fixed contact and at least one movable contact, comprising actuation means which are operatively connected to the movable contact and supply the energy to perform opening/closing operations, measuring means for detecting the voltage and/or the current of at least one of the phases of said network. The device according to the invention is characterized in that said actuation means comprise a motor with position control, which is operatively connected to the movable contact, and an electronic control and power supply unit which receives information from said measuring means and, following an operation command, sends to the motor electrical signals for driving said motor so that the movement of the movable contact is controlled in relation to a predetermined operation time and to said received information.

The actuation and control device thus conceived allows to accurately control the actuation of the switchgear and makes it possible to realize opening/closing operations which are synchronized, taking as a reference at least one of the phases of the electrical network. In this way, the voltage and current transients of the electrical network are eliminated, or at least limited as much as possible, thus reducing any anomalous stresses on the equipment presents. Furthermore, by using a motor with position control, the actuation and control device is also considerably simplified with respect to switchgear of the prior art, since it allows to eliminate the springs, the motor for reloading the closure spring, and all the mechanisms that allow to perform the switching cycles; accordingly, bulk is also reduced, and repeatability of maneuvers is guaranteed.

Further characteristics and advantages of the invention will become apparent from the description of some preferred but not exclusive embodiments of an actuation and control device for opening and/or closing an electric switchgear, illustrated only by way of non-limitative example in the accompanying drawings, wherein.

Figure 1:
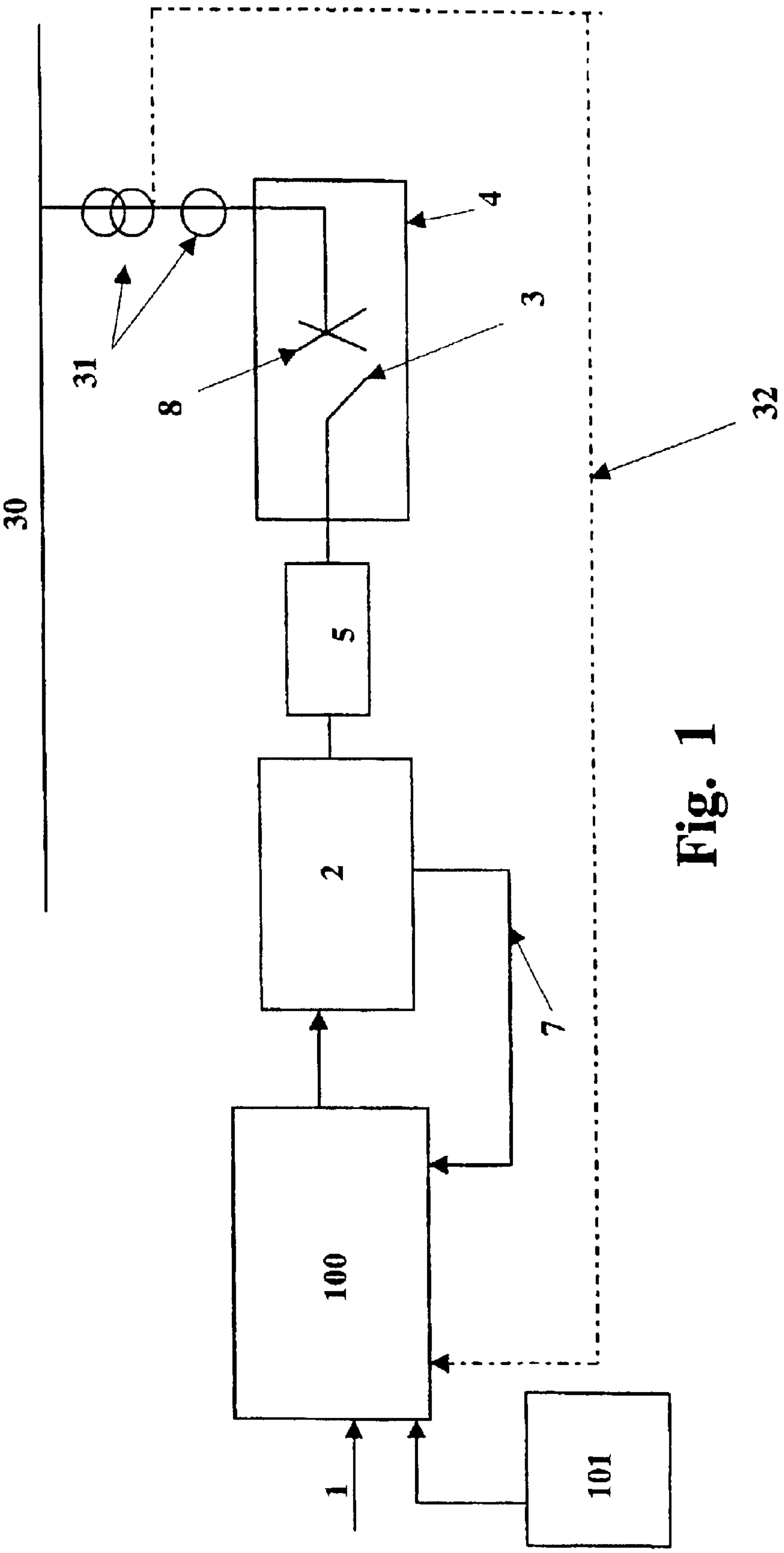
FIG. 1 is a block diagram of a device according to the invention.

With reference to FIG. 1, the actuation and control device according to the invention comprises an electronic control and power supply unit 100, which following an operation command 1 (arriving for example from an operator or from a protection system) actuates a motor with position control 2. The motor 2 is operatively connected to the movable contact 3 of an electric switchgear 4 by means of an adapted kinematic chain 5. In its turn, the switchgear 4, which comprises also at least one fixed contact 8, is connected to an electrical network 30; measuring means 31, for example current or voltage transformers, are provided for detecting the voltage and/or the current of at least one of the phases of said network 30.

Position control is generally performed by means of a position sensor located on the motor 2, which sends to the control unit 100 information 7 related to the movement of said motor 2. Position control can also be performed by a position sensor for the movable contact, which sends to the control unit 100 information related to the actual position of the movable contact 3. Said position sensor can simply be a limit switch, which reports to the control unit 100 that the required switching action has been completed.

Preferably, the motor 2 with position control is constituted by a rotary servomotor with a position sensor. In this case, the connection between the motor and the movable contact occurs by means of a kinematic pair, which is capable of converting the rotary motion of the driving shaft into a translatory motion of the movable contact. The use of a servomotor allows high power levels to be available with very short delivery times. For an equal power, it is furthermore possible to act with two independent control parameters (torque and/or speed), allowing greater flexibility during design.

The electronic control and power supply unit 100 is generally powered directly by the network 30. However, the device preferably also has an auxiliary energy-accumulation power supply system 101. Preferably, said system, constituted for example by a battery of capacitors, must be able to store and deliver at least the energy required for a quick opening/closing/opening (OCO) switching cycle.

As it will be described in detail hereinafter, by means of the control and power supply unit 100 it is possible to drive the motor 2 so that the movement of the movable contact 3 can be controlled in a simple and flexible manner, as a function of the operating command received, of a predetermined operation time, and of the type of fault possibly detected, and to perform opening/closing operations which are synchronized with respect to the current and/or the voltage of at least one of the phases of the network 30.

Figure 2:
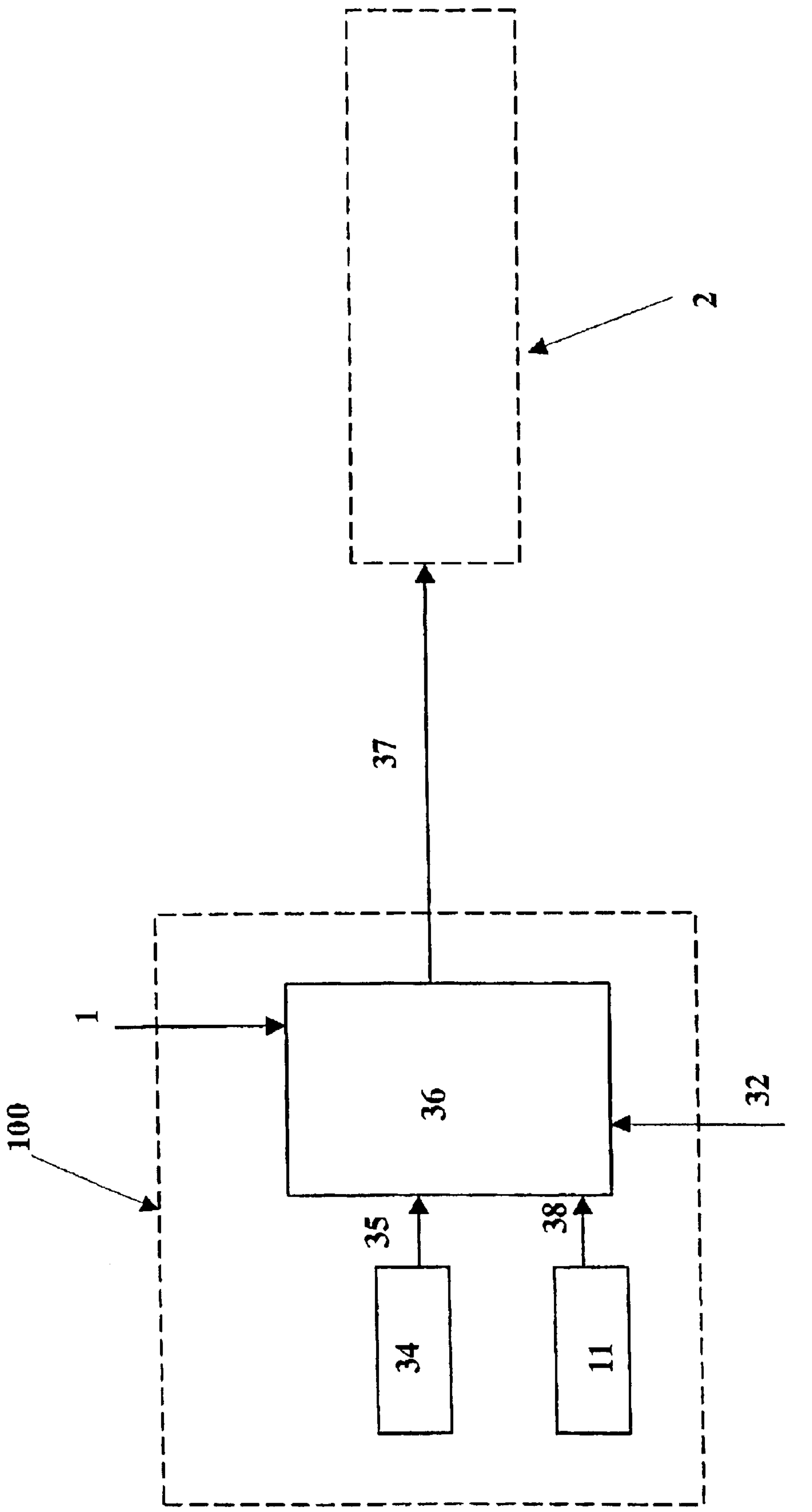
FIG. 2 is a block diagram showing schematically an electronic control and power supply unit used in the device according to the invention.

In particular, as illustrated in FIG. 2, in a preferred embodiment of the device according to the invention, the electronic control and power supply unit 100 comprises calculating means 11 which receive by said measuring means 31 information 32 tracking the electrical parameters of the network; in relation to this information, the calculating means 11, through suitable calculations, predict the succession of the zeros and maximums of the current and/or voltage of the phases following those detected, also taking account of frequency variations, harmonic components and single-phase transient components. In addition, they calculate the time between the zeros and maximums detected and those predicted, and send an indicative signal 38 to a timer and command unit 36.

Figure 5:
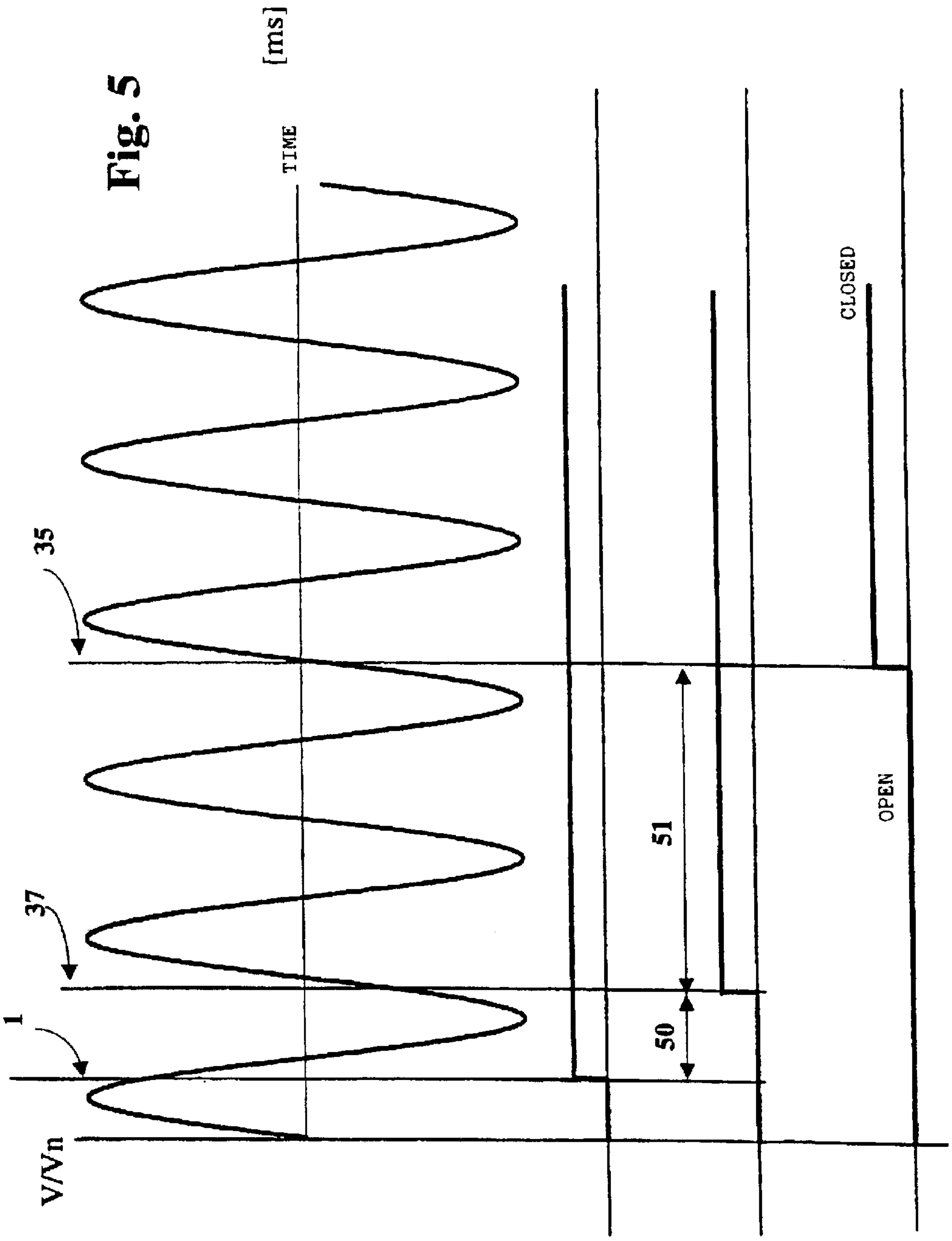
FIG. 5 is a diagram illustrating the voltage phase in relation to time in normal operating conditions.
Figure 6:
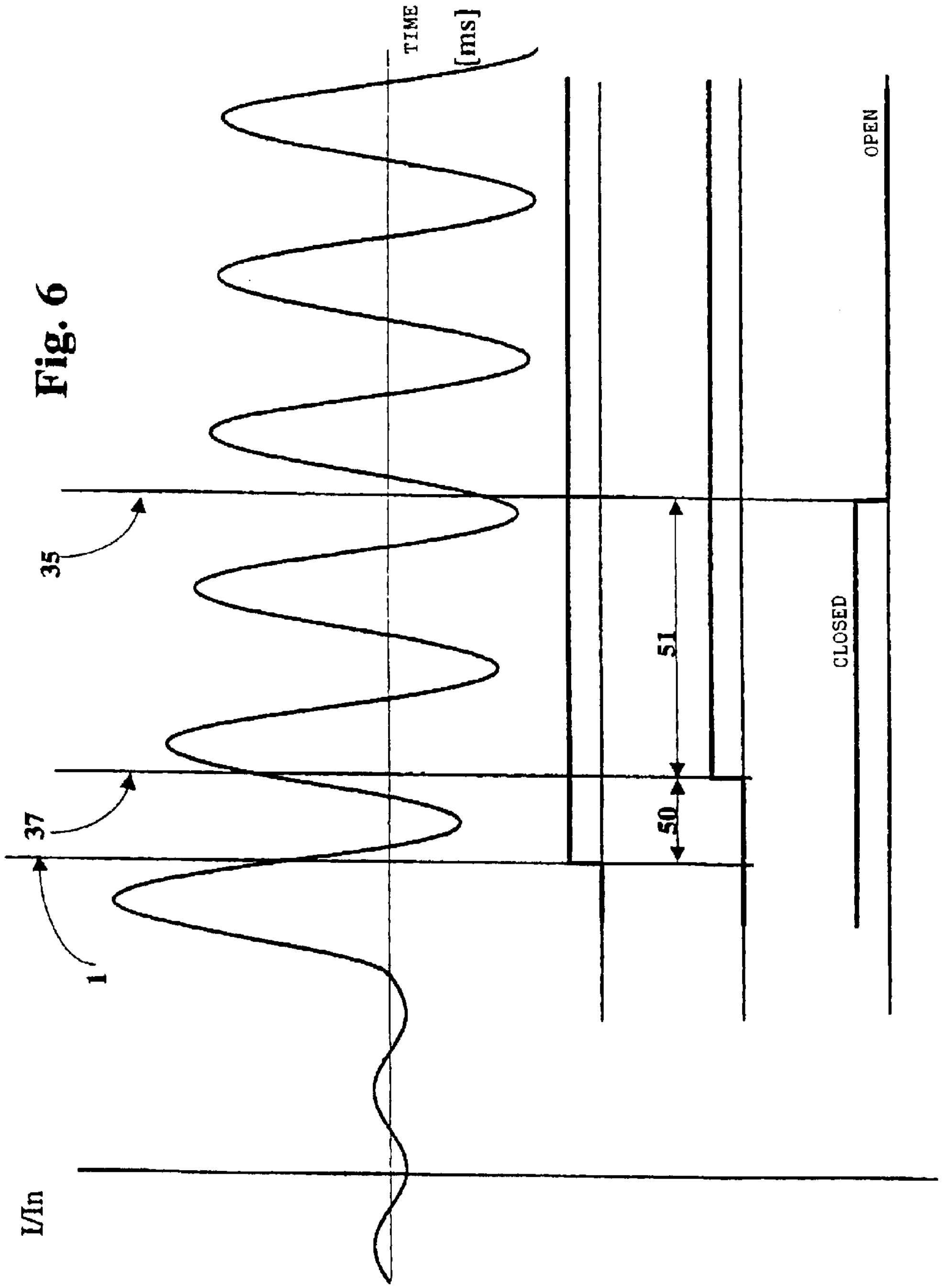
FIG. 6 is a diagram illustrating the current phase in relation to time in the presence of a transient.

In addition, the electronic control and power supply unit 100 advantageously comprise table means 34 that contain predetermined information regarding the type of load, the electrical network, the load and neutral network connection to ground, and send a signal 35 indicating the ideal end-of-operation times in relation to said predetermined information to a timer and command unit 36; furthermore, if it is required by the applications, said table means contain also information about the state of the neutral of the network 30. In this embodiment and as illustrated in FIGS. 5 and 6, the operation command 1 is sent to the timer and command unit 36 and is a command that is generally asynchronous in relation to the electrical network. The timer and command unit 36 outputs a corresponding synchronous start operating command 37 to the motor 2; this synchronous command 37 is delayed in relation to the asynchronous command 1 by a period of time 50 that is a function of the predetermined nominal operating time 51 and of the said signals 35 and 38 indicating the ideal end-of-operation times and the subsequent zeros or maximums predicted respectively, in order to identify the first subsequent ideal moment useful for implementing the synchronous operation. The desired ideal moment 35 is clearly the optimal time for eliminating operation transients in relation to the type of operation, load and electrical network; as illustrated in FIG. 6, this moment in time does not necessarily coincide with a zero or with a maximum but nevertheless ensures that the operation is performed within the synchronism window around the optimal instant.

A significant advantage of the invention resides in the fact that, by using a motor 2 with a position control, information about the movement of the movable contact 3 is sent to the electronic control and power supply unit 100 at each instant; in this way, it is possible to execute corrective actions, if any, during to the maneuver, thus performing a control in real time and ensuring execution of the operation in a predetermined nominal operation time. Moreover, position control performed on the motor (and/or on the movable contact 3) allows braking the movable contact at the end of the switching action, thus eliminating the need to use a shock absorber, and to have a great repeatability of the maneuvers as well. Recovery of energy during breaking operations is also possible, thereby reducing the total energy consumption.

If however, the deviation from the nominal behaviour at any point becomes accentuated during the operation, requiring a significant correction, the device is able to correct the predetermined nominal operation time in a self-organizing mode. In this case, the nominal operation time that is suitably monitored during the operations is redefined in relation to a new reference value; this new reference time is obviously made available to the unit 100.

It has in practice been noted how the device as in the invention makes it possible to achieve the task in full as well as the objects set in that it makes it possible to control the operations of the switchgear and to perform actuation of the movable contact 3 according to a controlled rule of motion, thus allowing to obtain operations which are synchronous with the electrical network, with the widest different types of electrical systems and loads present in them and even in the presence of faults.

This therefore results in significant advantages in terms of the elimination, or at least significant reduction of voltage and current transients in the network, as well as in terms of limiting electrodynamic and thermal stresses, with significant consequent benefits both for equipment present in the electrical network and of the switchgear used, considerably increasing its useful life and reliability.

Figure 3:
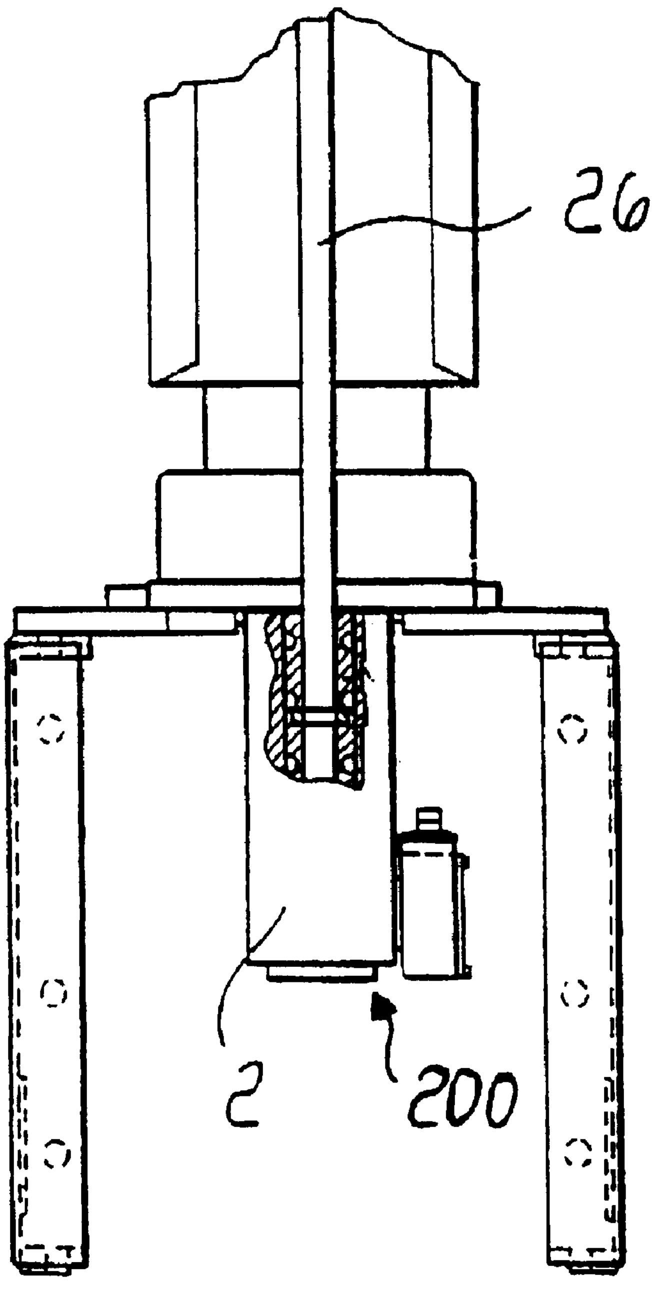
FIG. 3 is a view of a pole of a high-voltage circuit breaker provided with a device according to the invention.

The device according to the invention is conveniently applied in various kinds of electric switchgear, such as circuit breakers, disconnectors and the like, and is particularly adapted for high-voltage circuit breakers. FIG. 3 illustrates, schematically, an example of a pole of a high-voltage circuit breaker which comprises a control and actuation device according to the invention, indicated by the reference number 200, which is connected to the movable contact 3, not shown in figure, by means of a rod 26.

If the electrical switchgear is constituted by a three- pole high-voltage circuit breaker for opening and closing a circuit connected thereto, each individual pole can comprise an actuation and control device according to the invention. In this manner, by appropriately programming the electronic control and power supply unit 100, it is possible to provide a synchronous opening or closing action, in a very flexible way. For example, it is possible to use measuring means 31 for each phase of the electrical network 30 and to perform synchronized operation for each phase, independently from the others. Alternatively, it is possible to provide measuring means 31 for only one phase, which is considered as a reference, and to assume that the network is electrically symmetrical, namely that each phase is shifted from the previous of 120 electrical degrees.

Figure 4:
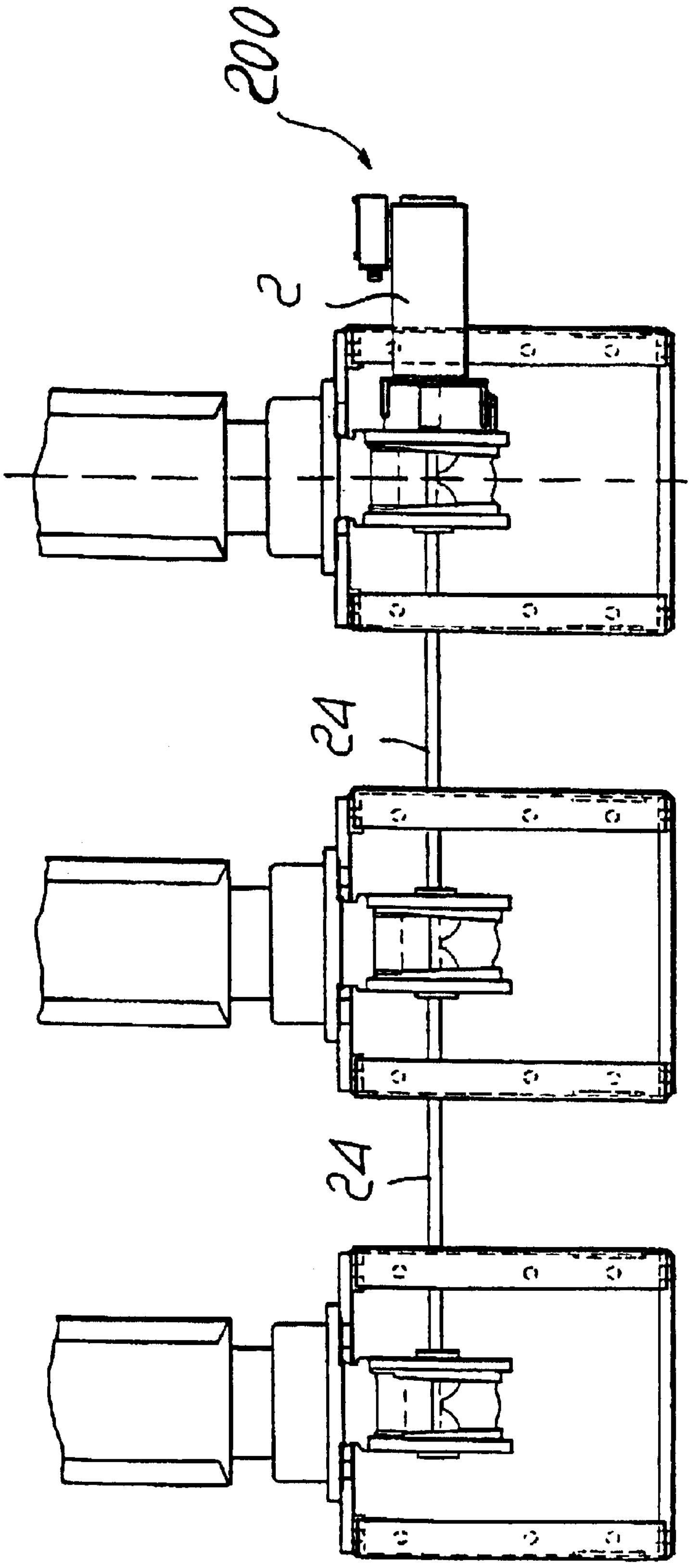
FIG. 4 is a view of a three-pole circuit breaker provided with a single actuation and control device according to the invention.

In a further embodiment, shown in FIG. 4, the three-pole circuit breaker can have a single actuation and control device according to the invention; in such situations, the device is mechanically coupled to each individual pole of the circuit breaker by adopting suitable rods 24. In this case, information on the electrical network is given by measuring means provided on a single phase.

In practice, it has been found that the actuation and control device according to the invention fully achieves the intended aim, since it allows to improve the characteristics of electric switchgear by controlling the rule of motion of the movable contact.

In addition to the above advantages, the actuation and control device allows to reduce costs by reducing the parts, reducing the calibration operations and eliminating movements and stresses that can give rise to impact damage. Accordingly, maintenance costs are also reduced.

The device thus conceived is susceptible of modifications and variations, all of which are within the scope of the inventive concept; all the details may furthermore be replaced with technically equivalent elements. In practice, the materials used, so long as they are compatible with the specific use, as well as the dimensions, may be any according to the requirements and the state of the art.

What is claimed is:

1. An actuation and control device for opening and/or closing an electric switchgear (4) which is connected to an electrical network (30) and has at least one fixed contact (8) and at least one movable contact (3), comprising actuation means which are operatively connected to the movable contact (3) and supply the energy to perform opening/closing operations, and measuring means (31) for detecting the voltage and/or the current of at least one of the phases of said network (30), characterized in that said actuation means comprise a motor with position control (2), which is operatively connected to the movable contact (3), and an electronic control and power supply unit (100) which receives information from said measuring means (31) and, following an operation command (1), sends to the motor (2) electrical signals for driving said motor (2) so that the movement of the movable contact (3) is controlled in relation to a predetermined operation time and to said received information.

2. An actuation and control device according to claim 1 characterized in that the opening and/or closing is synchronized with respect to at least one of the phases of the electrical network (30).

3. An actuation and control device according to claim 1, characterized in that position control is performed by a position sensor on the motor.

4. An actuation and control device according to claim 1, characterized in that said motor with position control is a rotary servomotor.

5. An actuation and control device according to claim 1, characterized by the fact that said electronic control and power supply unit comprises:

calculating means suitable for predicting the zeros and maximums of the voltage and of the current of the phases subsequent to those detected by said measuring means and for calculating the period of time between the zeros and maximums detected and those predicted.

6. An actuation and control device according to claim 5 characterised by the fact that said electronic control and power supply unit (100) comprises table means (34) containing predetermined information regarding the type of load and the load and network neutral connection to ground, said table means (34) being able to output a signal (35) indicating the ideal end-of-operation times in relation to said predetermined information.

7. An actuation and control device according to claim 6 characterized by the fact that said electronic control and power supply unit (100) comprises a timer and command unit (36) that receives in input:

an operation command (1) that is asynchronous in relation to the electrical network (30);

the signal indicating the ideal end-of-operation times (35);

the signal indicating the subsequent predicted zeros or maximums (38);

and outputs a corresponding synchronous operating command (37) that is delayed in relation to said asynchronous operating command (1) by a period of time (50) that is a function of the predetermined operation time (51) and of said signals (35, 38) indicating the ideal end-of-operation times and the predicted subsequent zeros or maximums.

8. A pole of a high-voltage circuit breaker, characterized in that it comprises an actuation and control device according to claim 1.

9. A three-pole high-voltage circuit breaker for opening and closing a circuit connected thereto, characterized in that it comprises, for each pole, an actuation and control device according to claim 1.

10. A three-pole high-voltage circuit breaker for opening and closing a circuit connected thereto, characterized in that it comprises an actuation and control device according to claim 1 and a mechanism for coupling said device to each individual pole of the circuit breaker.

11. A high or medium voltage disconnector characterized in that it comprises an actuation and control device according to claim 1.

* * * * *